(12) United States Patent
Lohndorf et al.

(10) Patent No.: US 7,745,746 B2
(45) Date of Patent: Jun. 29, 2010

(54) MICROMACHINED MECHANICAL SWITCH

(75) Inventors: Markus Lohndorf, Munich (DE); Terje Kvisteroey, Horten (NO)

(73) Assignee: Infineon Technologies Sensonor AS, Horten (NO)

( * ) Notice: Subject to any disclaimer, the term of this patent is extended or adjusted under 35 U.S.C. 154(b) by 235 days.

(21) Appl. No.: 12/017,769

(22) Filed: Jan. 22, 2008

(65) Prior Publication Data
US 2009/0183979 A1 Jul. 23, 2009

(51) Int. Cl.
*H01H 35/02* (2006.01)
(52) U.S. Cl. .............................. 200/61.45 R; 200/61.46
(58) Field of Classification Search ............. 200/61.49, 200/61.46, 61.45 R, 245–247
See application file for complete search history.

(56) References Cited

U.S. PATENT DOCUMENTS

| | | | | |
|---|---|---|---|---|
| 3,043,927 | A * | 7/1962 | Lockhart et al. | 200/61.46 |
| 6,369,712 | B2 * | 4/2002 | Letkomiller et al. | 340/572.1 |
| 6,414,592 | B1 * | 7/2002 | Dixit et al. | 340/447 |
| 2004/0220650 | A1 * | 11/2004 | Houben et al. | 607/116 |
| 2008/0264537 | A1 * | 10/2008 | Behrends et al. | 152/152.1 |
| 2009/0243830 | A1 * | 10/2009 | Heise et al. | 340/447 |

FOREIGN PATENT DOCUMENTS

JP 04159160 A * 6/1992

* cited by examiner

*Primary Examiner*—Renee S Luebke
*Assistant Examiner*—Lisa Klaus
(74) *Attorney, Agent, or Firm*—Edell, Shapiro & Finnan, LLC

(57) ABSTRACT

A mechanical switch is arranged to electrically connect a power source to an electrical component. The switch includes a resilient structure, a first electrically conductive element connected to the power source and a second conductive element connected to the electrical component. At least one of the conductive elements is attached to the resilient structure. The switch is arranged such that the conductive elements are positioned out of contact with one another in the absence of a force being applied to the switch, and the resilient structure is moveable in response to a force applied thereto, the force being applied upon rotation of a tire to which the switch is connected. Upon the application of a force above a predetermined threshold, the resilient structure moves to bring the conductive elements into contact with one another, the contact electrically connecting the power source to the electrical component.

10 Claims, 5 Drawing Sheets

MICROMACHINED MECHANICAL SWITCH

FIELD OF THE INVENTION

The present invention relates to a mechanical switch. In particular, the invention relates to a mechanical switch arranged to electrically connect a power source to an electrical component in response to a force applied to the switch.

BACKGROUND

Tire pressure monitoring systems (TPMS) in vehicle tires typically have a separate power source, such as a battery, to which the remaining TPMS circuitry is coupled in order to power the system. Currently microelectronic structures, such as transistors and MOSFET devices, have been proposed as power switches to ensure that adequate power is provided to the system. In addition, both MEMS accelerometers and traditional mechanical structures have been used in order to detect the motion of a wheel or vehicle, which in turn provides a "wake-up" signal to power up the TPMS.

However, these systems have a disadvantage in that the microelectronic device (ASIC and MEMS) itself exhibits a stand-by current; a known TPMS ASIC has a stand-by current in the order of 500 nA at a temperature of 25° C., which increases as the temperature of the device increases. Typically, at least 50% of the power consumption over the lifetime of the TPMS battery, which is approximately ten years, is due to this stand-by current. This is the case even where the above-described motion detection arrangement is employed, as although such an arrangement helps in saving battery power, the saving is not significant in comparison to that lost.

The invention seeks to overcome the above problems associated with known devices.

SUMMARY

According to the present invention there is provided a mechanical switch arranged to electrically connect a power source to an electrical component, the switch comprising: a resilient structure; and a first electrically conductive element connected to the power source and a second conductive element connected to the electrical component, wherein at least one of the conductive elements is attached to the resilient structure. The switch is arranged such that: the conductive elements are positioned out of contact with one another in the absence of a force being applied to the switch; the resilient structure is moveable in response to a force applied thereto, the force being applied upon rotation of a tire to which the switch is connected; and, upon the application of a force above a predetermined threshold, the resilient structure moves to bring the conductive elements into contact with one another, the contact electrically connecting the power source to the electrical component.

The mechanical switch allows a complete separation of its electrically conductive elements in the absence of an applied force above a certain threshold value, thereby completely separating the battery from the sensor and electronics of a TPMS in which the mechanical switch is employed. Creating a galvanic open circuit in this way avoids the battery being drained by stand-by currents, resulting in a significant reduction of the overall power consumption of the TPMS.

The mechanical switch can additionally be used as a motion detector and in the determination of the contact area between a tire and a surface along which the tire is rotating, known as the tire "footprint".

BRIEF DESCRIPTION OF THE DRAWINGS

The mechanical switch will now be described in detail with reference to the accompanying drawings, in which.

DETAILED DESCRIPTION

Figure 1:
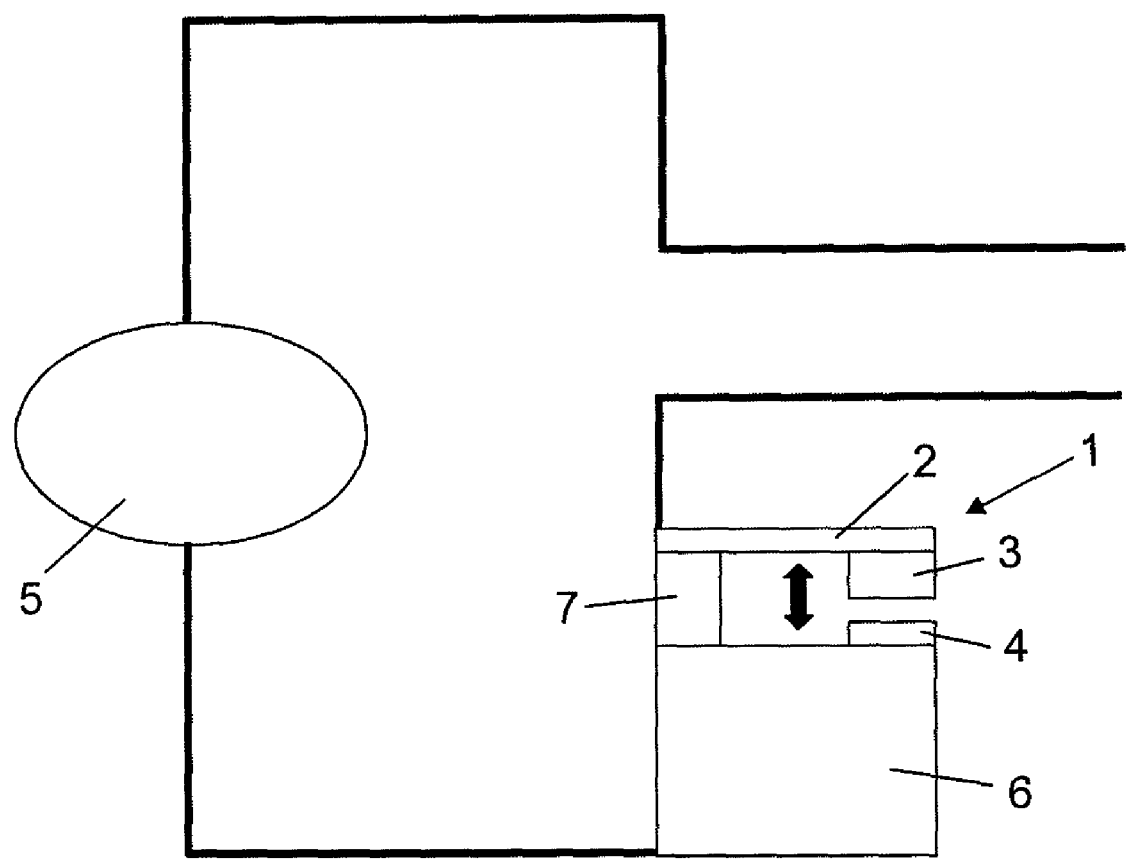
FIG. 1 shows a schematic diagram of a mechanical switch connected to a power source according to an embodiment of the invention.

Referring to FIG. 1, a mechanical switch 1 is shown. The switch 1 has a resilient structure 2 and two electrically conductive elements 3, 4, a first of which 3 is connected to a power source 5, such as a battery, or an energy harvester with a rectifier, and a second of which 4 is connected to an electrical component of a circuit or device (not shown) to be powered, such as a tire pressure monitoring system (TPMS). In FIG. 1, the first conductive element 3 is attached to the resilient structure 2, while the second conductive element 4 is connected to a base 6 of the switch 1. An electrically insulating portion or layer 7 is optionally present to aid in electrically insulating the conductive elements 3, 4 when they are out of contact.

Figure 2A:
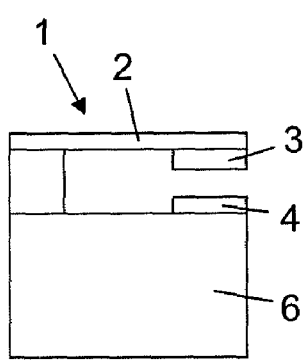
FIGS. 2a, 2b and 2c illustrate the switch of FIG. 1 in an open state where no force is applied to the switch, an open state when a force below a threshold is applied to the switch, and a closed state when a force above the threshold is applied to the switch.
Figure 2B:
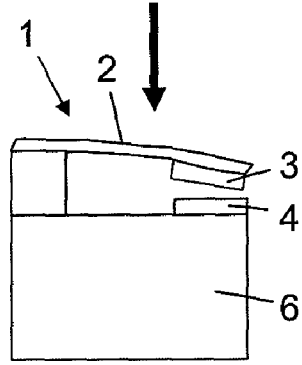
Figure 2C:
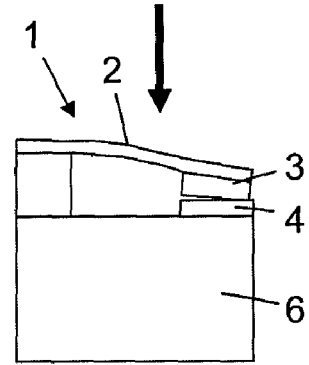

The structure 2 is resilient in the sense that it is moveable under an applied force. Therefore, when placed within a stationary tire employing, for example, a TPMS, the switch 1 is open (R>$10^9$ Ω or R>1 GΩ), as shown in FIG. 2a. However, as a force is applied to the resilient structure 2, for example due to the radial centripetal acceleration present upon the rotation of the tire, the structure 2 moves to bring the conductive elements 3, 4 closer to one another. In FIG. 2b, the force is not great enough to bring the conductive elements 2, 3 into contact, so again the resistance is very large (R>1 GΩ).

Upon the application of a force above a predetermined threshold, the resilient structure 2 moves to bring the conductive elements 3, 4 into contact with one another. This contact electrically connects the power source 5 to the TPMS circuitry, closing or completing the circuit and allowing current to flow from the power source 5 to the TPMS circuitry (of typically R<100Ω). The threshold depends on the design parameters of the switch 1, including the mechanical stiffness of the resilient structure 2.

Figure 3:
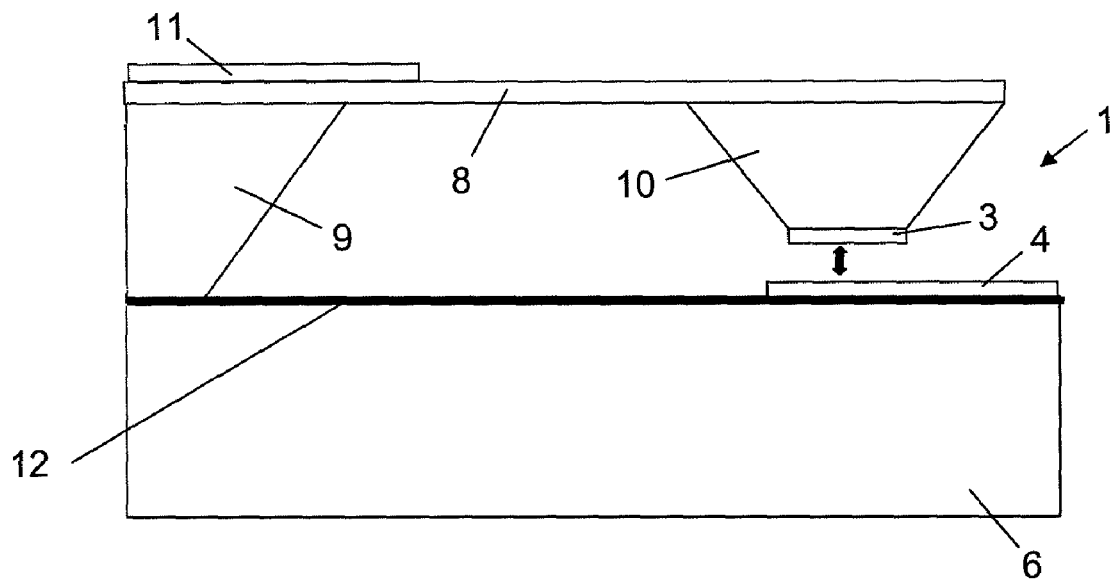
FIG. 3 shows an embodiment of the switch according to the invention.

FIG. 3 shows an embodiment of the switch 1 in the form of a micro electromechanical system (MEMS). The resilient structure 2 is preferably a mechanical spring 8 formed of a silicon layer, which is supported towards one end thereof by a silicon support substrate 9. A seismic mass 10, which is also preferably formed of silicon, is provided towards another end of the silicon layer 8. The spring 8, support substrate 9 and mass 10 may be integrally formed, using known techniques such as etching, from a single silicon substrate.

The conductive elements 3, 4 act as electrode areas, and are coated against oxidation and wear and provide Ohmic contact. A wire bond contact pad 11 is provided to connect the switch 1 to one of the electrical component or the power source 5, while the conductive element 4 preferably takes the form of another wire bond contact pad that provides electrical connection to the other of the electrical component or the power source 5. The electrically conductive elements 3, 4 and contact pad 11 are preferably formed of gold or ruthenium, and comprise barrier and adhesion underlayers.

In the embodiment of FIG. 3, the base 6 is provided in the form of a pyrex glass layer, to which the support substrate 9 and conductive element 4 are preferably anodically bonded (anodic bond 12).

The switch is preferably manufactured by micro machining (milling) or MEMS techniques. A manufacturing technique and switch 1 using MEMS technology is preferred in the case of providing the switch 1 in or on the tire, for example in or on the inner liner of the tire, in which case a very low weight compared to known devices (for example, a switch of less than 1 gram in weight) is required.

The switch 1 is preferably arranged such that it is sensitive to acceleration in the order of between 1 g and 10 g, where g is the gravitational acceleration, which can represent the threshold acceleration. The switch 1 must also be robust enough to withstand much higher accelerations, typically around 2000 g to 5000 g, for relatively short periods of time (typically 0.1-10 ms).

The electrical characteristic of the conductive elements 3, 4 should preferably realize a contact resistance of less than 100Ω over the lifetime of the switch 1. Such a long term surface characteristic is maintained by using precious metals such as gold. An alternative surface layer material of the elements 3, 4 is ruthenium, which builds up an oxide which is highly conductive, and which is more durable against wear through long term use.

The elastic properties of the resilient structure 2 of the mechanical switch 1 should ensure: a controlled bouncing pattern during closing of the switch 1; the provision of the required restoring forces to separate the conductive elements 3, 4 of the switch 1 during opening; and protection of the resilient structure 2 upon the application of relatively high shocks to the switch 1.

The switch allows mechanical decoupling of the power supply from the TPMS circuitry by creating an open circuit and therefore infinite resistance (R>1 GΩ), and no additional current leakage other that the intrinsic power supply leakage occurs. In known accelerometer triggered mechanical structures, the battery is disconnected from the device to be powered when no external force is applied. However, by applying a force due to an additional acceleration, such as the radial acceleration due to the tire or wheel rotation, above a certain threshold, the mechanical switch is closed with a low resistance (typically R<100Ω) and allows a power-up of the TPMS circuitry or module. Therefore, the switch allows for an inherent motion detection, whose threshold is adjustable by changing the design parameters of the mechanical structure.

Figure 4:
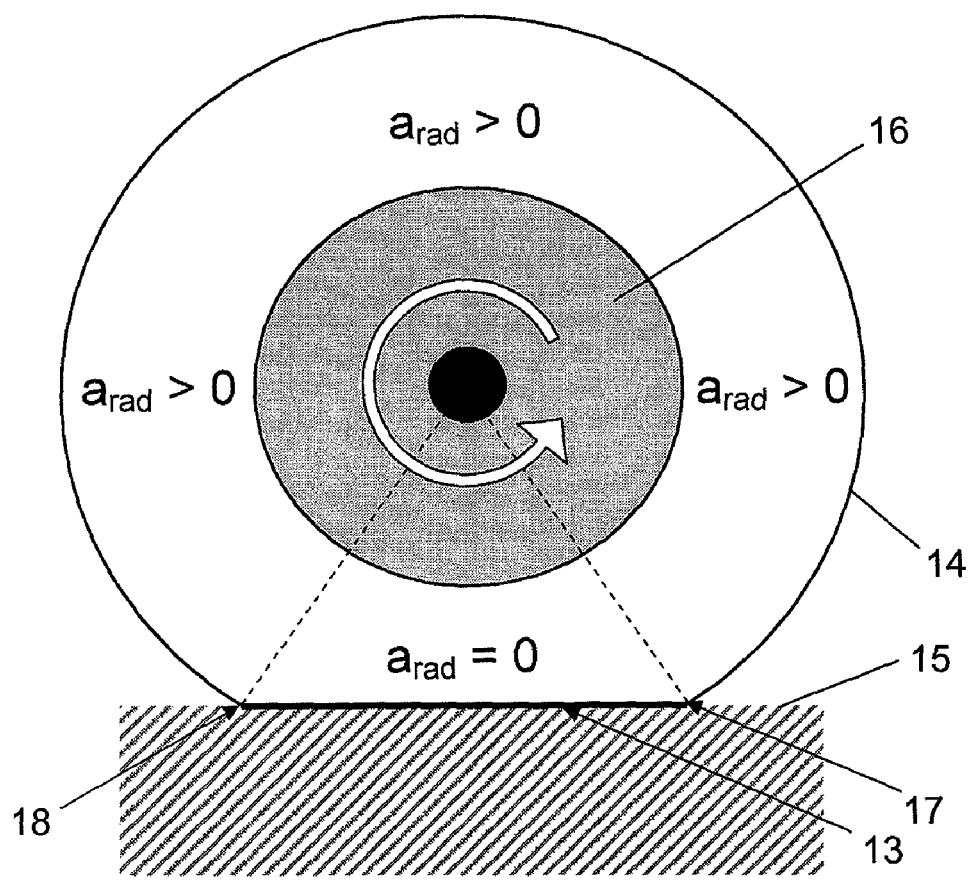
FIG. 4 shows the footprint of a rotating tire.

In addition to the above advantages, the "footprint" of the tire can be measured where the applied force direction is the radial direction of the tire. The "footprint" 13 of a rotating tire 14 is the part of the circumferential length of the tire that is in contact with the surface 15 which the rotating tire 14 contacts (for example, the ground in the case of a vehicle tire), as shown in FIG. 4. The footprint length depends on the absolute tire pressure and the load condition of the tire. The radial acceleration is zero at the footprint 13 of the tire 14, that is, between a leading edge 17 and a trailing edge 18 of the tire 14. Therefore the switch 1 is open and the power source 5 is disconnected from the electrical component of the device to be powered while the switch 1 is within the footprint region 13. The radial acceleration of the tire is greater than zero at all points that do not form part of the footprint. By monitoring the on-off time of the power source 5 during rotation of the tire 14 or a wheel 16 on which the tire 14 is installed, the length of the footprint 13 can be calculated and hence the vertical load and/or the center of mass of, for example, a vehicle incorporating the tire 14 can be determined (provided that the speed that the tire 14 is traveling along the surface 15, for example the speed of the vehicle, is known).

Figure 5:
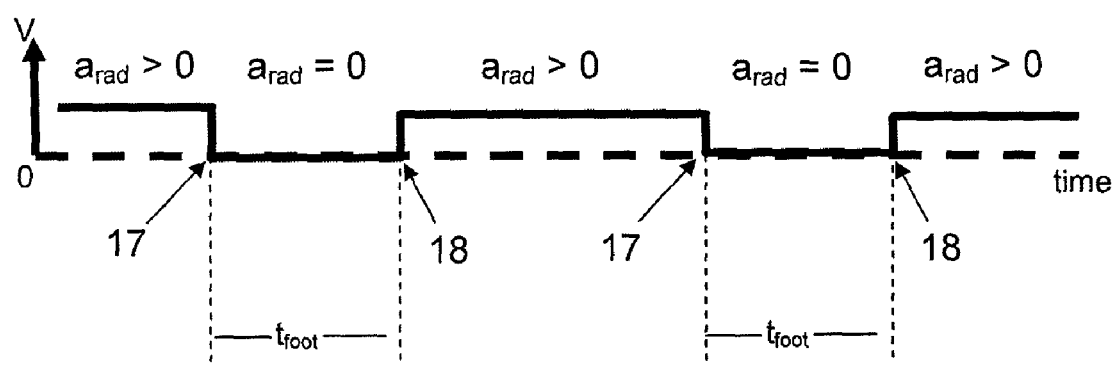
FIG. 5 shows the change in voltage supplied trough the switch according to an embodiment of the invention as the tire of FIG. 4 rotates.

FIG. 5 shows how the above effect is used to measure the footprint. The voltage (V) supplied through the switch 1 is measured against time as the switch 1 rotates with the tire 14. The period of time $t_{foot}$ when the voltage is zero is a measurement of the time during which the switch 1 is at the tire footprint 13 between the leading edge 17 and trailing edge 18 and is therefore open. Hence, the switch will open from a closed state as it enters the tire footprint 13 and the radial acceleration becomes zero, and it will close again upon leaving the footprint once the acceleration exceeds the threshold acceleration. Additionally, if the absolute pressure of the tire 14 is measured simultaneously, the vertical load on the tire 14 can be determined.

Figure 6:
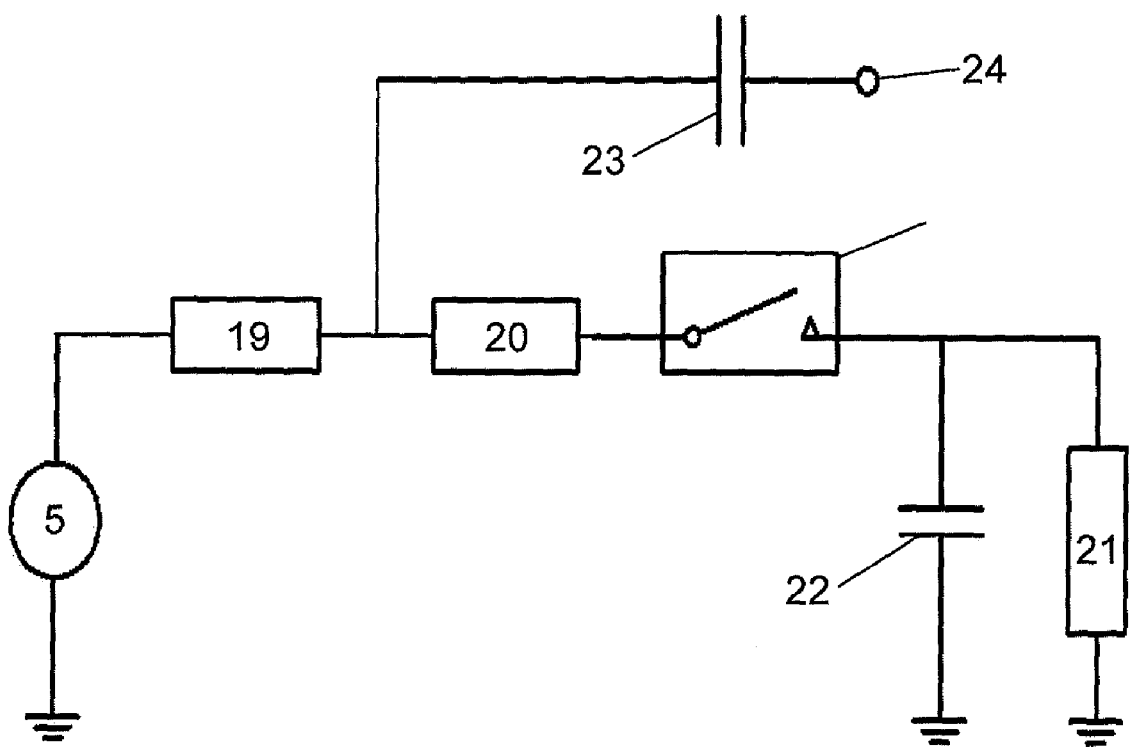
FIG. 6 shows an electrical equivalence diagram of the switch according to an embodiment of the invention incorporated into a system.

FIG. 6 shows an electrical equivalence diagram of the mechanical switch 1 incorporated into a system, such as a TPMS, that is powered by the power source 5 upon closing the switch 1. A resistor 19 represents the internal series resistance of the power source 5, which is typically a battery or an energy harvester with a rectifier. A further resistance 20 represents the internal series resistance of the mechanical switch 1. A load 21 represents the electronic component, circuit or device, such as a TPMS, that the power source 5 is to be electrically connected to upon closing of the switch 1. A capacitor 22 secures smooth power supply voltage build-up as the switch 1 opens and closes. A further capacitor 23 illustrates the capacitive coupling of circuitry 24 for detecting the footprint signal.

Figure 7:
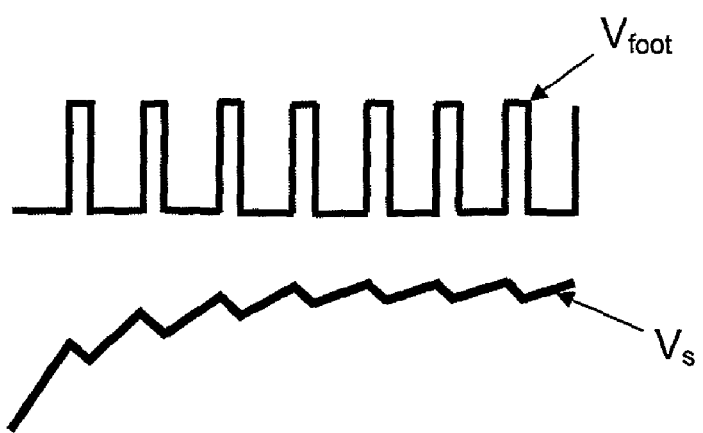
FIG. 7 shows the build-up of the supply voltage in the system of FIG. 6.

FIG. 7 shows the build-up of the supply voltage $V_s$ over the capacitor 22 of FIG. 6, the voltage across which is shown by $V_{foot}$, after the threshold acceleration has been reached.

Figure 8:
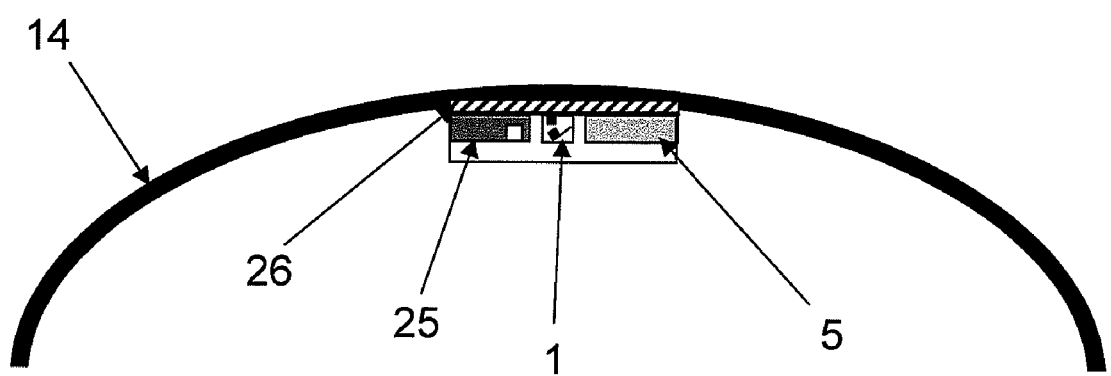
FIG. 8 shows a cross-sectional view of a tire incorporating the switch according to an embodiment of the invention.

FIG. 8 shows a cross-sectional view of a tire incorporating the switch according to the invention. The mechanical switch 1, power source 5 and a sensor integrated circuit 25 are placed on a printed circuit board 26, preferably on the tire inner liner.

The mechanical switch 1 therefore provides a number of advantages over known systems. Extremely low stand-by currents are experienced owing to the opening of the switch in the absence of an applied force above a certain threshold value. Therefore, only the inherent power source leakage, which is around 1% of a typical battery's supply, is lost in this way, providing the power source with a much longer lifetime that could previously be obtained. When applied in a system such as a TPMS, inherent adjustable motion detection is provided at no additional cost. The footprint of a tire employing the switch, and hence the vertical load of a vehicle comprising the tire, can be determined. The switch is preferably manufactured using micro technology such as MEMS technology, providing a low cost manufacturing process owing to wafer processing techniques, a switch that is smaller in size and lighter in weight than known devices, and enabling micro electronic integration of the switch into a range of systems and locations.

What is claimed is:

1. A tire pressure monitoring system (TPMS) comprising:
a power source;
TPMS circuitry; and
a mechanical switch positioned between the power source and the TPMS circuitry and arranged to electrically connect a power source to an electrical component, the switch comprising:
a resilient structure; and
a first electrically conductive element connected to the power source and a second conductive element connected to the electrical component, at least one of the conductive elements being attached to the resilient structure,
wherein the switch is arranged such that:
the conductive elements are positioned out of contact with one another in the absence of a force being applied to the switch;
the resilient structure is moveable in response to a force applied thereto, the force being applied upon rotation of a tire to which the switch is connected; and
upon application of a force above a predetermined threshold, the resilient structure moves to bring the conductive elements into contact with one another, the contact electrically connecting the power source to the electrical component.

2. The switch according to claim 1, wherein the electrical component forms part of the tire pressure monitoring system (TPMS).

3. The switch according to claim 1, wherein the force is applied in a substantially radial direction of the tire.

4. The switch according to claim 1, wherein the switch is a micro mechanical device.

5. The switch according to claim 1, wherein the resilient structure is arranged such that the resilient structure is sensitive to an acceleration in the order of between 1 g and 10 g, where g is the gravitational acceleration.

6. The switch according to claim 1, wherein contact resistance between the electrically conductive elements is less than 100 ohms.

7. The switch according to claim 1, wherein at least one of the electrically conductive elements comprise gold.

8. The switch according to claim 1, wherein at least one of the electrically conductive elements comprise ruthenium.

9. The TPMS according to claim 1, wherein the system is arranged to determine a footprint of a tire in which the TPMS is provided.

10. The TPMS according to claim 9, wherein the system is arranged to determine vertical load of a vehicle comprising the tire in which the TPMS is provided.

* * * * *